United States Patent
Clay

[19]

[11] Patent Number: 6,142,397
[45] Date of Patent: Nov. 7, 2000

[54] SELF-PROPELLED POWERED BROADCAST SPREADER

[75] Inventor: Jan C. Clay, Venice, Fla.

[73] Assignee: Blue Marble Turf Products, Inc., Plainfield, Ind.

[21] Appl. No.: 09/405,724

[22] Filed: Sep. 24, 1999

Related U.S. Application Data

[60] Provisional application No. 60/102,293, Sep. 29, 1998.

[51] Int. Cl.[7] ............................. A01C 17/00; A01C 19/02
[52] U.S. Cl. ........................................... 239/684; 239/687
[58] Field of Search .................................. 239/665, 668, 239/684, 687

[56] References Cited

U.S. PATENT DOCUMENTS

| | | | |
|---|---|---|---|
| D. 346,281 | 4/1994 | Vidal | D6/370 |
| 2,847,224 | 8/1958 | Stout | 275/8 |
| 3,405,514 | 10/1968 | Pulrang | 56/25.4 |
| 3,523,648 | 8/1970 | Garber | 238/668 |
| 4,234,131 | 11/1980 | Baker | 239/685 |
| 4,352,463 | 10/1982 | Baker | 239/663 |
| 4,597,203 | 7/1986 | Middleton | 37/241 |
| 4,798,325 | 1/1989 | Block | 239/663 |
| 5,333,795 | 8/1994 | Jessen | 239/663 |
| 5,340,033 | 8/1994 | Whitell | 239/676 |
| 5,385,306 | 1/1995 | Cervenka | 239/684 X |
| 5,485,963 | 1/1996 | Walto et al. | 239/663 |
| 5,599,068 | 2/1997 | Kelly et al. | 297/448.1 |
| 5,860,604 | 1/1995 | Kooiker | 239/684 |

*Primary Examiner*—Lesley D. Morris
*Attorney, Agent, or Firm*—Woodard, Emhardt, Naughton, Moriarty & McNett

[57] ABSTRACT

The present invention provides a two-wheeled, self-propelled broadcast spreader. One embodiment of the present invention is a self-propelled broadcast spreader mounted on a frame and having a product hopper mounted on the frame. An axle is rotatably mounted to said frame and has opposing ends. Two wheels are mounted to the opposing ends of the axle wherein at least one wheel is driven by rotation of the axle. A motor is mounted to the frame and is coupled to a transmission. A drive mechanism is coupled between the transmission and the axle, wherein operation of the transmission drives the axle and correspondingly propels the wheel. A spreader gearing is coupled to the axle wherein the spreader gearing is driven by rotation of the axle. A spreader plate is mounted to the spreader gearing, wherein the spreader plate is situated to receive product fed from the product hopper. During use, the spreader plate is rotated by the spreader gearing to broadcast product. An alternate embodiment is a motorizer kit suitable to be retro-fitted on an unpowered spreader.

20 Claims, 5 Drawing Sheets

SELF-PROPELLED POWERED BROADCAST SPREADER

This application claims priority to provisional application No. 60/102,293, filed on Sep. 29, 1998, and which is hereby incorporated by reference.

FIELD OF THE INVENTION

The present invention relates generally to broadcast spreaders, and more particularly to a self-propelled, broadcast spreader.

BACKGROUND OF THE INVENTION

Professional lawn care providers frequently have a need for broadcast spreaders for distributing wet or dry products over broad areas such as a lawns, golf courses, or sidewalks. Typical products include seeds, fertilizers, weed control products, salt for ice, sand and other topical applications. Many traditional broadcast spreaders have been manually operated where the spreader mechanism is driven by the rotation of the wheels. This has suffered from the weaknesses such as that the operator pushing the spreader may be tired, distracted or otherwise move at an uneven speed or the spreader wheels may slip on wet grass or ice, resulting in an uneven and inconsistent application of the product.

Attempts to address this problem have included attaching spreaders to powered lawn equipment or attempting to create an independently powered cart with a spreader. When a spreader is attached to other lawn equipment the operator must mechanically attach the spreader, and if the spreader is powered, must in some way connect the spreader to a power-take-off on the equipment. This requires complexity, frequent adjustment and additional maintenance and is often a source of frustration to the user. Additionally, the larger size of the assembly may limit the areas to which product may be easily applied.

Previous engines with sufficient power to propel a spreader and simultaneously broadcast product have required larger supports. Such spreaders have involved four-wheeled carts upon which a motor and spreader are mounted. Examples of such spreaders are shown in U.S. Pat. Nos. 3,405,514; 4,234,131; 4,352,463; 4,798,325 and 5,333,795. These designs have suffered from excess weight, are often top-heavy, and are frequently off-balance when used on slopes or hills where power is most needed. Further, four-wheeled carts can be difficult to maneuver in areas without much clearance and the engines have suffered from high maintenance and emission problems.

Accordingly, there is a need for a smaller, maneuverable, low maintenance self-propelled broadcast spreader. The present invention addresses these needs.

SUMMARY OF THE INVENTION

The present invention provides a two-wheeled, self-propelled broadcast spreader. One embodiment of the present invention is a self-propelled broadcast spreader having a frame and a product hopper mounted on the frame. An axle is rotatably mounted to said frame and has opposing ends. Two wheels are mounted to the opposing ends of the axle wherein at least one wheel is driven by rotation of the axle. A motor is mounted to the frame and is coupled to a transmission. A drive mechanism is coupled between the transmission and the axle, wherein operation of the transmission drives the axle and correspondingly propels the wheel. A spreader gearing is coupled to the axle wherein the spreader gearing is driven by rotation of the axle. A spreader plate is mounted to the spreader gearing, wherein the spreader plate is situated to receive product fed from the product hopper. During use, the spreader plate is rotated by the spreader gearing to broadcast product. An alternate embodiment is a motorizer kit suitable to be retro-fitted on an unpowered spreader.

It is an object of the present invention to provide an improved self-propelled broadcast spreader.

Further objects, features and advantages of the present invention shall become apparent from the detailed drawings and descriptions provided herein.

DESCRIPTION OF PREFERRED EMBODIMENTS

For the purposes of promoting an understanding of the principles of the invention, reference will now be made to the embodiments illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

The present invention provides a self-propelled powered broadcast spreader which is used by lawn care personnel and others to efficiently broadcast product over a large area. The spreader may be sold as a complete spreader or as a motorizer kit to be retro-fitted onto an unpowered spreader. In particular the present invention may be used with products such as fertilizer, weed control products, seeds, salt for ice, sand and similar products. Preferred embodiments of the present invention provide even distribution of product, even propulsion, maneuverability, ease of access to parts and low maintenance.

Figure 1:
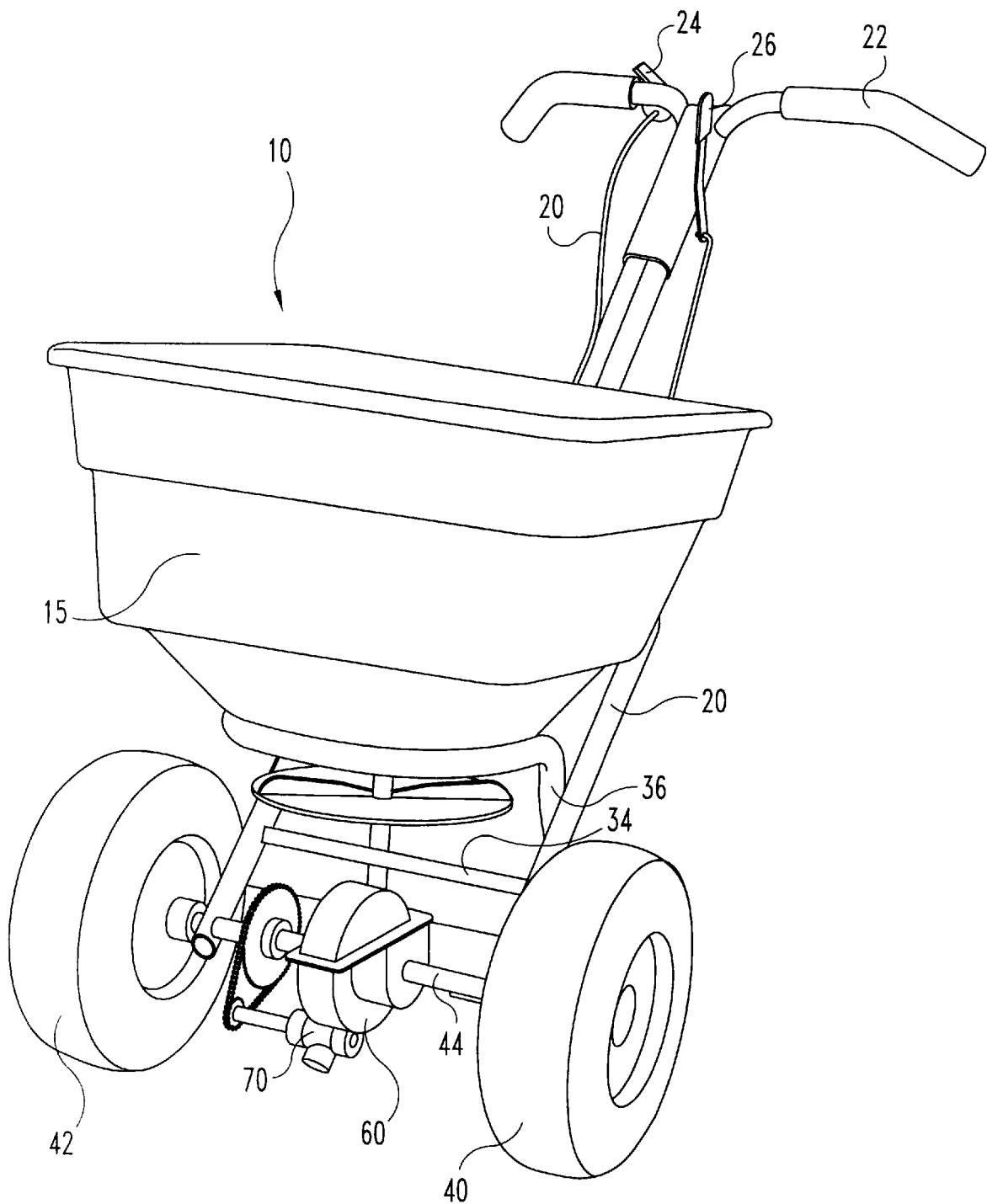
FIGS. 1 and 2 are perspective views of one embodiment of the present invention
Figure 2:
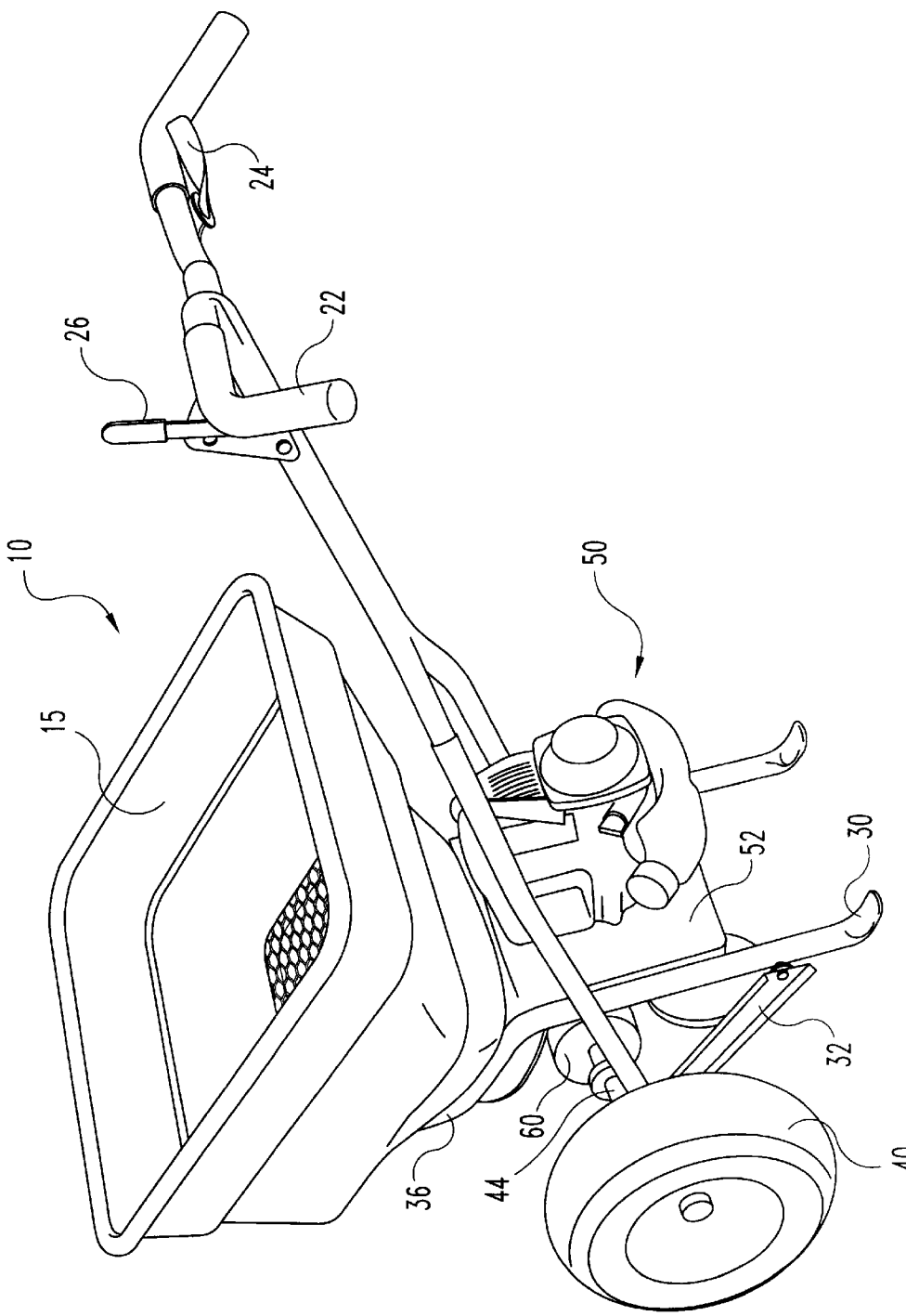

Prospective views of one embodiment of broadcast spreader 10 are illustrated in FIGS. 1 and 2. Broadcast spreader 10 includes frame 20, upon which hopper 15 is mounted. Frame 20 includes handles 22, throttle thumb switch 24 and product feed control 26. Frame 20 further includes support legs 30, braces 32 and 34 and hopper mount 36. Support plate 52 is mounted between legs 30, and motor 50 is mounted on support plate 52. Wheels 40 and 42 are mounted on opposing ends of axle 44 which is rotatably connected to said frame.

Figure 3:
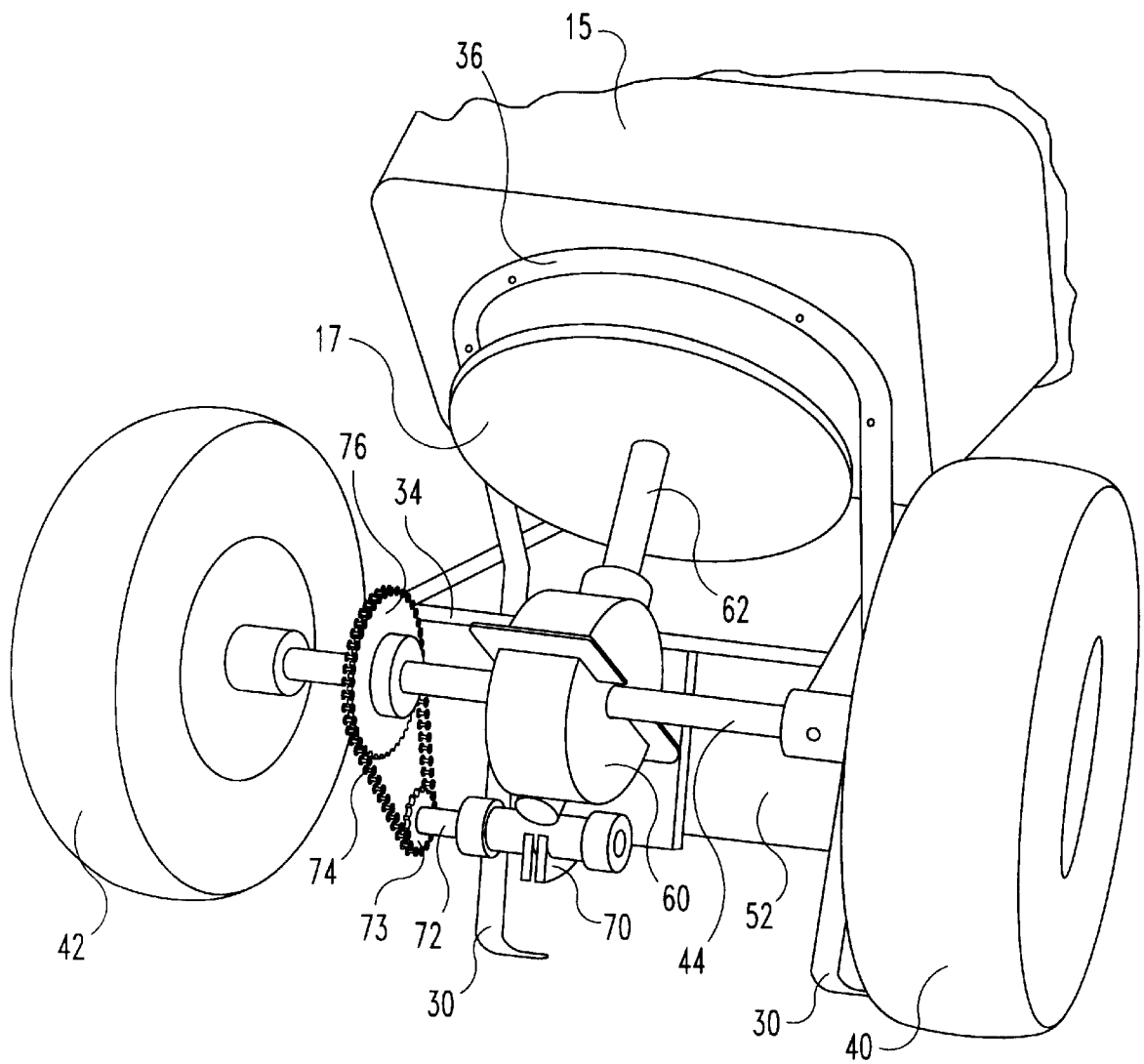
FIG. 3 is an upward, perspective view of the drive assembly of the embodiment of the invention shown if FIGS. 1 and 2.

The drive and broadcast assembly of spreader 10 is shown in close-up detail in FIG. 3. Transmission 70 is mounted at one end to plate 52 where it is coupled with motor 50. The opposing end of transmission 70 holds drive shaft 72 which terminates in sprocket gear 73. Sprocket gear 73 engages chain 74 to drive axle gear 76 mounted on axle 44. In one embodiment axle 44 drives wheel 40, although it could drive both wheels 40 and 42. Spreader gearbox 60 is mounted in cooperation with axle 44. Shaft 62 extends from gearbox 60 to spreader plate 17 which rotates when driven.

Figure 4:
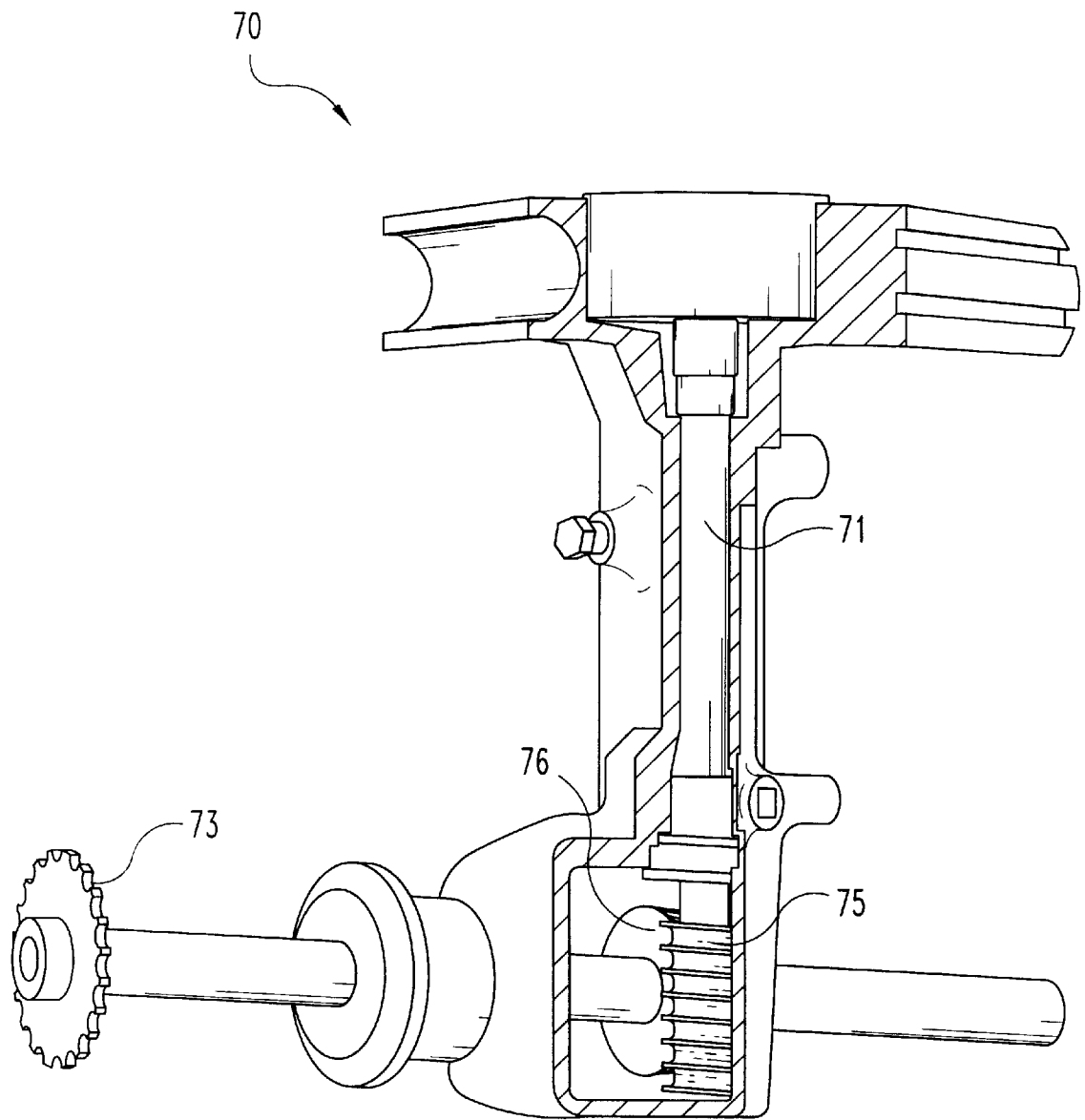
FIG. 4 is a partially cut-away view of the transmission gearing used in one embodiment of the present invention.

Transmission 70 is illustrated in a cut-away view in FIG. 4. Drive shaft 71 extends from the top of transmission 70 to a coupling driven by motor 50 (not shown). Drive shaft 71 extends internally to worm gear 75 in mating engagement with pinion gear 76 on crossed drive shaft 72. Drive shaft 72 extends to sprocket gear 73. Pinion gear 76 on shaft 72 may either be a separate gear or can have gear teeth formed on shaft 72. One example of a suitable transmission is a modular worm gear reduction box sold by Hoffco Outdoor Power Equipment of Richmond, Ind. In other embodiments, a clutch and gearbox can be substituted for the transmission. One example of a gearbox is a 15:1 reduction box designated NRV040, made by Motovario in Italy.

Figure 5:
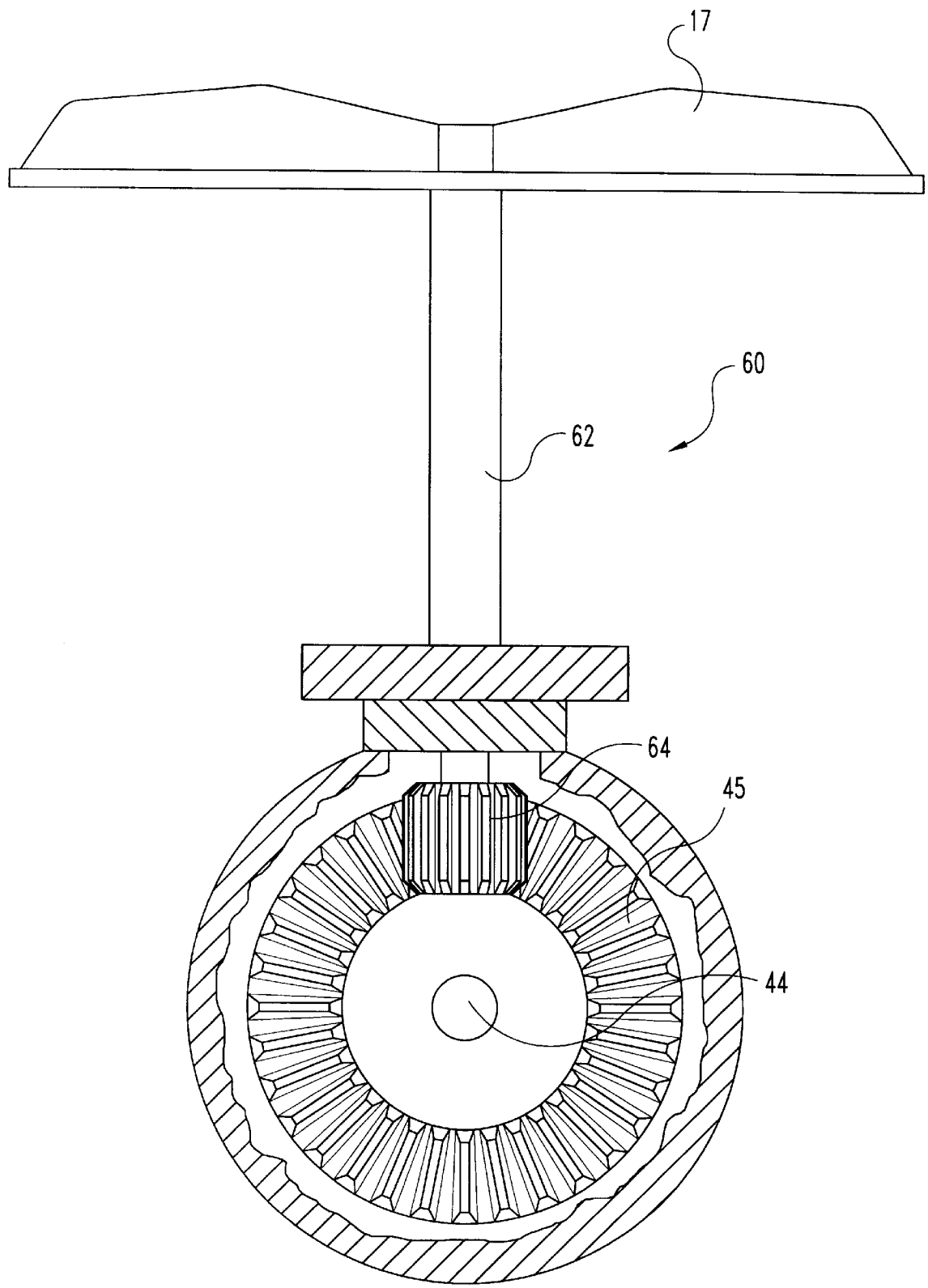
FIG. 5 is a side, partially cut-away view of the spreader gearing used in one embodiment of the present invention.

FIG. 5 illustrates spreader gearbox 60 in a side, partially cut-away view. Driving face gear 45 is mounted on axle 44 and is in meeting engagement with pinion gear 64 on spreader shaft 62. Spreader shaft 62 extends to spreader plate 17 which is configured to broadcast product when turned.

To enhance the ease of use and maneuverability of the spreader, preferred embodiments include lightweight and non-rusting materials such as a plastic hopper and a stainless steel or aluminum frame, gearshafts and connectors. Preferably, the gearing assemblies are water-resistant. In an alternate embodiment a motorizer kit may be retro-fitted to an existing spreader.

For general use, it is preferred that the propelled speed of the spreader is in a range between about 2.0 and about 4.0 miles per hour, with a preferred range between about 2.5 and about 3.0 miles per hour. In one embodiment 13-inch tires are used, requiring a turning speed of about 64 rpm to provide spreader speed of about 2.5 miles per hour.

For efficient operation an engine lightweight in size is needed, yet it must provide sufficient power to simultaneously propel the spreader and broadcast the product. Additionally, some states have strict specifications on emissions for power equipment, and it is preferred that the engine meet those as well. One example of a suitable engine is provided in Honda's 4-stroke, 1.5 horsepower model GX 31. In one preferred embodiment, the engine includes a built in centrifugal clutch.

To properly provide power from the engine to the wheels and spreader, reduction gearing is required between the motor and the axle and again to the spreader gearing. By way of illustration, in one preferred embodiment the gear reduction in transmission 70 is about 32:1 with an additional reduction made from sprocket gear 73 to drive axle 44 in the range of 3.5:1. In one embodiment, for illustration, the clutch of the engine may engage around 3250 rpm with the normal operating speed of the engine between about 4,000 and about 7,000 rpm, preferably about 6,000 rpm. In one embodiment of the drive mechanism, gear sprocket 73 on transmission shaft 72 is a nine (9) tooth sprocket and operates with a chain to engage a twenty-two (22) tooth sprocket 73 on axle 44. Alternately, a belt and pulleys or similar drives could be used. Preferably, the gear reduction in the drive mechanism is between about 2.5:1 and 3.5:1. Controls, including throttle thumb switch 24 coupled to motor and feeder control 26 coupled to hopper 15, are standard to motors and spreaders as will be understood by those of skill in the art.

In operation, a desired product is loaded into hopper 15 and the feed rate is set using feeder control 26. Engine 50 is started and the speed is controlled with thumb throttle 24. When motor 50 has reached sufficient speed to engage the clutch, it supplies power to transmission 70 and by association to axle 44 and spreader gearbox 60. Axle 44 drives at least wheel 42 propelling the spreader. Spreader gearbox 60 powers broadcast plate 17 to broadcast the product. The positive power connection between the motor and the spreader mechanism provides evenly broadcast product even when wheel 42 slides and does not gain a purchase, such as on wet grass or ice.

In some embodiments plate 52 and side deflector flaps may be used to limit the dispersal of the product, such as to force salt, sand or weed killer to be concentrated on a sidewalk or a particular path. Overall, the spreader is designed to use a minimum of parts with easy access for service and to minimize weight. By minimizing the size and weight of the spreader, lawn care personnel or others may more easily maneuver the spreader while in use or in loading for transport in a trailer or rack. In a preferred embodiment, the total weight of the spreader (empty) is less than fifty pounds. Since the spreader is self-propelled, and lightweight it reduces fatigue on the user. Moreover, with the motor and transmission low on the spreader, it lowers the center of gravity to minimize the tendency to tip or spill on grades or uneven surfaces.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

What is claimed is:

1. A self-propelled broadcast spreader for spreading product, comprising:
   a frame;
   an axle rotatably mounted to said frame and having opposing ends;
   a motor mounted to said frame;
   a transmission mounted to said frame and operably coupled to said motor;
   a drive mechanism coupled between said transmission and said axle, wherein operation of said transmission drives said axle;
   two wheels mounted to said opposing ends of said axle wherein at least one wheel is driven by rotation of said axle;
   a spreader gearbox coupled to said axle wherein said spreader gearbox is driven by rotation of said axle; and,
   a spreader plate attached to said spreader gearbox, said spreader plate being situated and configured to receive and broadcast product.

2. The spreader of claim 1 further comprising a product hopper mounted on said frame.

3. The spreader of claim 2 further comprising a mounting plate attached to said frame and wherein said motor and transmission are mounted to said frame via said mounting plate.

4. The spreader of claim 2 wherein said transmission has a gear reduction of about 32:1.

5. The spreader of claim 3 wherein said drive mechanism includes a chain drive.

6. The spreader of claim 5 wherein said drive mechanism has a gear reduction between about 2.5:1 and about 3.5:1.

7. The spreader of claim 5 wherein said spreader is propelled in a range between about 2.0 to about 4.0 miles per hour.

8. The spreader of claim 7 wherein the operating speed of said motor is between about 4,000 and about 7,000 rpm.

9. The spreader of claim 7 wherein said frame is aluminum or stainless steel.

10. A two-wheeled, self-propelled broadcast spreader, comprising:

a frame attachable to a hopper;

an axle rotatably mounted to said frame and having opposing ends where the wheels are mounted and driving at least one wheel;

a spreader gearing operably interacting with said axle, wherein said spreader gearing is driven by rotation of said axle;

a spreader plate mounted to said spreader gearing, said spreader plate being situated to receive product fed from said product hopper;

a motor mounted to said frame;

a transmission mounted to said frame and driven by said motor;

a drive mechanism operably coupled to said transmission and said axle to drive said axle.

11. The spreader of claim 10 further comprising a mounting plate attached to said frame and wherein said motor and transmission are mounted to said frame via said mounting plate.

12. The spreader of claim 11 wherein said transmission has a gear reduction of about 32:1.

13. The spreader of claim 11 wherein said drive mechanism includes a chain drive.

14. The spreader of claim 11 wherein said drive mechanism has a gear reduction between about 2.5:1 and about 3.5:1.

15. The spreader of claim 14 wherein said frame is aluminum or stainless steel.

16. A motorizer kit attachable to the frame and axle of a broadcast spreader, comprising:

a mounting plate mountable to the frame of the spreader;

a motor mounted to said mounting plate;

a transmission mounted to said mounting plate and coupled to said motor wherein said transmission is driven by said motor;

a drive mechanism operably coupled between said transmission and the axle to drive the axle.

17. The spreader of claim 16 wherein said transmission has a gear reduction of about 32:1.

18. The spreader of claim 17 wherein said drive mechanism includes a chain drive.

19. The spreader of claim 18 wherein said drive mechanism has a gear reduction between about 2.5:1 and about 3.5:1.

20. The spreader of claim 19 wherein said frame is aluminum or stainless steel.

* * * * *